US 6,540,410 B2

(12) United States Patent
Childers et al.

(10) Patent No.: US 6,540,410 B2
(45) Date of Patent: Apr. 1, 2003

(54) PANEL-MOUNTED FIBER OPTIC CONNECTOR

(75) Inventors: Darrell R. Childers, Hickory, NC (US); Hieu Tran, Charlotte, NC (US); Eric W. Kent, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/739,187

(22) Filed: Dec. 18, 2000

(65) Prior Publication Data
US 2002/0076165 A1 Jun. 20, 2002

(51) Int. Cl.[7] .................................................. G02B 6/36
(52) U.S. Cl. .......................................... 385/78; 385/77
(58) Field of Search ............................. 385/78, 72, 70, 385/77, 55; 439/63, 581

(56) References Cited

U.S. PATENT DOCUMENTS

| 5,212,752 A | * | 5/1993 | Stephenson et al. .......... 385/78 |
| 5,214,732 A | * | 5/1993 | Beard et al. .................. 385/78 |
| 5,245,683 A | | 9/1993 | Belenkiy et al. .............. 385/72 |
| 5,809,192 A | * | 9/1998 | Manning et al. .............. 385/78 |
| 6,019,520 A | * | 2/2000 | Lin et al. ....................... 385/76 |
| 6,234,683 B1 | * | 5/2001 | Waldron et al. ............... 385/78 |
| 6,259,856 B1 | * | 7/2001 | Shahid .......................... 385/147 |
| 6,302,591 B1 | * | 10/2001 | Nagaoka et al. .............. 385/59 |

* cited by examiner

Primary Examiner—Lynn Field
Assistant Examiner—Michael C. Zarroli

(57) ABSTRACT

A fiber optic connector for mounting on a panel comprises an outer housing defining an interior passage extending longitudinally therethrough, and at least one mounting element connected with the outer housing for mounting the connector onto the panel. The connector also includes a connector insert subassembly inserted through the rear end of the outer housing into the interior passage thereof. The connector insert subassembly is slidable longitudinally within the outer housing, and comprises an inner housing defining an inner passage extending longitudinally therethrough, and a ferrule holder and ferrule mounted within the inner passage of the inner housing. A compression spring is inserted into the rear end of the outer housing abutting the connector insert subassembly, and a spring retainer is inserted into the outer housing behind the compression spring to capture the spring in a compressed condition so as to cause the spring to bias the connector insert subassembly forwardly against a stop defined by the outer housing.

24 Claims, 4 Drawing Sheets

PANEL-MOUNTED FIBER OPTIC CONNECTOR

FIELD OF THE INVENTION

The present invention relates to fiber optic connectors. The invention relates more particularly to fiber optic connectors that can be mounted on a circuit board, backplane, or other panel, and that are compatible with standard adapters and other fixtures such as polishing fixtures that are commonly used.

BACKGROUND OF THE INVENTION

Fiber optic connectors are attached at to ends of optical fibers to enable one or more optical fibers to be optically coupled with one or more other optical fibers of another connector or other optical transmission device. A fiber optic connector generally includes a housing in which a forwardly projecting ferrule is mounted. Usually, one or more optical fibers pass through the ferrule and have ends that are flush with or project slightly beyond the forward end of the ferrule for coupling with the end of one or more other optical fibers in a complementary fiber optic connector or device. The housing of the connector typically includes features for locking the connector in engagement with the complementary connector or device.

In some applications, it is desirable to mount a fiber optic connector on a circuit board, backplane, or other panel. Various panel-mountable fiber optic connectors have been developed. U.S. Pat. No. 5,245,683 shows one such panel-mounted connector, comprising a housing, a cylindrical ferrule, and a ferrule holder adapted to be secured around the ferrule. The ferrule holder has a flange and the housing has a rearwardly facing shoulder against which the flange of the ferrule holder abuts when the ferrule holder is inserted through the rear end of the housing. A spring is inserted into the rear end of the housing behind the ferrule holder, and the spring engages the flange of the ferrule holder. The legs of a U-shaped spring-retaining clip are inserted transversely into the housing through openings therein for holding the spring in a compressed position so that the spring biases the ferrule holder and ferrule forwardly. The spring allows the ferrule to "float" to facilitate close coupling of the ferrule with the ferrule of another connector. The housing is molded of plastic and has a pair of integrally formed projecting pegs for inserting into holes in a circuit board to mount the connector on the board. The spring-retaining clip can be removed while the connector remains mounted on the board, so that the ferrule holder and ferrule can be removed from the housing for repair or replacement.

Another type of panel-mounted connector that is commercially available is an SC compatible connector that has a ferrule holder that can be oriented in one of four different positions rotationally displaced from one another about the axis of the ferrule for "tuning" the direction of the concentricity of the optical fiber in the ferrule with respect to the housing of the connector. A disadvantage of this connector is that the ferrule concentricity angle cannot always be optimized, and thus the insertion loss cannot always be minimized. Another disadvantage of this connector is that it is not compatible with standard automated SC polishing fixtures that are used for other SC connectors, and hence the ferrule must be manually polished.

SUMMARY OF THE INVENTION

The present invention addresses the above needs by providing a panel-mounted (or board-mounted) fiber optic connector that, in preferred embodiments of the invention, can be used in automated polishing fixtures and is compatible with standard adapters. The connector preferably also includes a "pre-tuned" ferrule holder and ferrule assembly whose concentricity angle is in a predetermined orientation, the ferrule holder being mountable in the connector in only one orientation so that the concentricity angle is always in a predetermined orientation relative to the connector.

To these ends, a fiber optic connector in accordance with one preferred embodiment of the invention comprises an outer housing defining an interior passage extending longitudinally therethrough, and at least one mounting element connected with the outer housing for mounting the connector onto a panel. The connector also includes a connector insert subassembly inserted through the rear end of the outer housing into the interior passage thereof. The connector insert subassembly is slidable longitudinally within the outer housing, and comprises an inner housing defining an inner passage extending longitudinally therethrough, and a ferrule holder, ferrule, and a spring mounted within the inner passage of the inner housing. A compression spring is inserted into the rear end of the outer housing abutting the connector insert subassembly, and a spring retainer is inserted into the outer housing behind the compression spring to capture the spring in a compressed condition so as to cause the spring to bias the connector insert subassembly forwardly against a stop defined by the outer housing.

Preferably, the ferrule holder and ferrule are slidable as a unit in the longitudinal direction within the inner housing, and the connector insert subassembly further comprises a ferrule spring and a member connected with the inner housing for compressing the ferrule spring between the member and the ferrule holder such that the ferrule spring biases the ferrule holder forwardly against a stop defined by the inner housing. A forward portion of the ferrule preferably projects longitudinally forward out a forward end of the inner housing when the ferrule holder is biased forward by the ferrule spring against the stop of the inner housing. The forward end of the inner housing preferably also projects longitudinally forward out the forward end of the outer housing when the connector insert subassembly is biased forward by the compression spring against the stop of the outer housing.

In the preferred embodiment of the invention, the outer housing defines openings through opposite side walls thereof, and the inner housing includes projections that are accessible through the openings in the outer housing for engagement with resilient fixing members of a polishing fixture. Thus, the connector can be inserted into the polishing fixture of polishing apparatus until the resilient fixing members of the polishing fixture engage the projections on the inner housing of the connector, thereby securing the connector in the fixture. The outer housing preferably also includes ramp surfaces proximate the openings through the side walls thereof, the ramp surfaces sloping outwardly away from a central longitudinal axis of the connector in the forward longitudinal direction such that pulling rearwardly on the outer housing causes the ramp surfaces to move the resilient fixing members of the polishing fixture outwardly to disengage the projections on the inner housing so that the connector can be removed from the fixture.

The spring retainer and the outer housing preferably are structured and arranged such that the spring retainer is inserted into the rear end of the outer housing in the forward longitudinal direction until cooperative retaining elements formed on the spring retainer and the outer housing engage each other to fix the spring retainer in the longitudinal direction. The retaining elements comprise one or more resilient projections formed on one of the spring retainer and the outer housing, and one or more recesses formed in the other of the spring retainer and the outer housing for receiving the resilient projection(s). Preferably, the spring retainer has the projection(s) and the outer housing has one or more openings therethrough so that the spring retainer can be removed from the outer housing by depressing the projection(s) so as to disengage the opening(s), enabling the spring retainer to be pulled out the rear end of the outer housing.

If desired, a mounting element that mounts the connector on the panel can also be provided. This can be accomplished in one embodiment by providing the mounting element in the form of an elongate fastener passing transversely through the outer housing and out one side wall thereof for engaging an opening through the panel, and by providing the spring retainer with a recess through which the elongate fastener extends such that the spring retainer may be removed with the fastener installed. However, the spring retainer may also be configured to allow its removal with the fasteners installed.

The mounting element preferably has a pair of the elongate fasteners that pass through the outer housing for engaging a pair of holes in the panel. Alternatively or additionally, the mounting element can include a pair of protrusions formed integrally with the outer housing for engaging openings in the panel. The protrusions can be split so that they resiliently snap into the openings in the panel.

To facilitate optimization of the concentricity angle of the ferrule, the ferrule holder preferably includes a concentricity alignment feature formed thereon in a predetermined location with respect to a measured concentricity angle of an optical fiber mounted in the ferrule. The inner housing includes a cooperative alignment feature that is engaged by the concentricity alignment feature on the ferrule holder when the ferrule holder is rotated about a central longitudinal axis thereof so as to circumferentially align the alignment features. In this manner, the measured concentricity angle of the optical fiber is located in a predetermined direction with respect to the inner housing. The alignment features preferably comprise a slot formed in one of the ferrule holder and the inner housing and a key formed on the other of the ferrule holder and the inner housing for engaging the slot. Preferably, the alignment features are structured and arranged so that the ferrule holder can be mounted in the inner housing in only one position. Accordingly, the concentricity angle of the ferrule can be optimized.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

Figure 1:
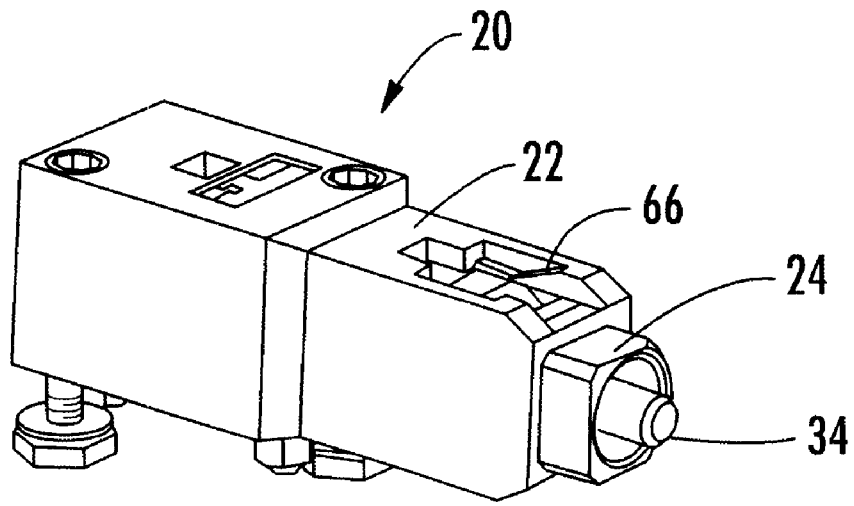
FIG. 1 is a perspective view of a panel-mounted fiber optic connector in accordance with a preferred embodiment of the present invention.
Figure 2:
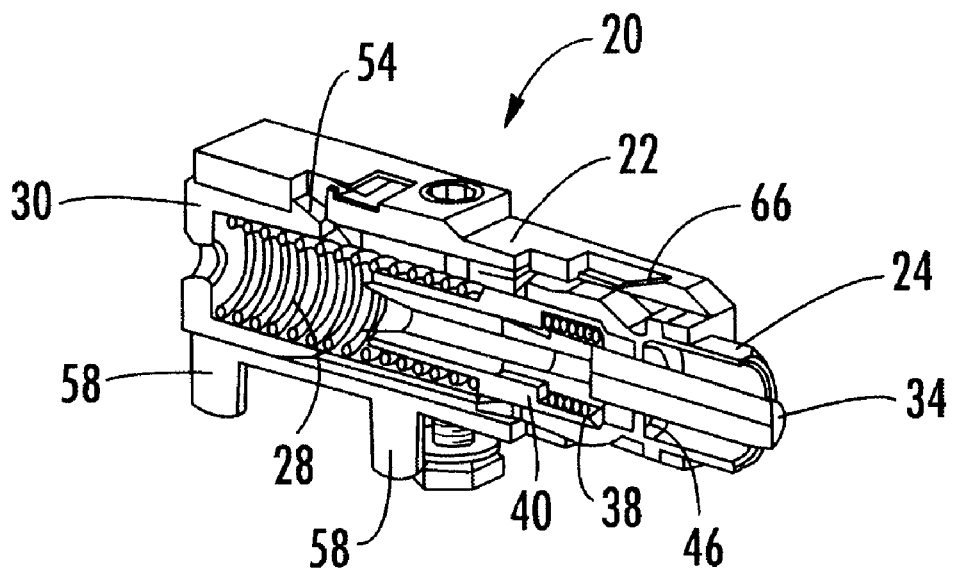
FIG. 2 is a perspective view of the connector of FIG. 1 sectioned in half along a vertical longitudinal plane.
Figure 3:
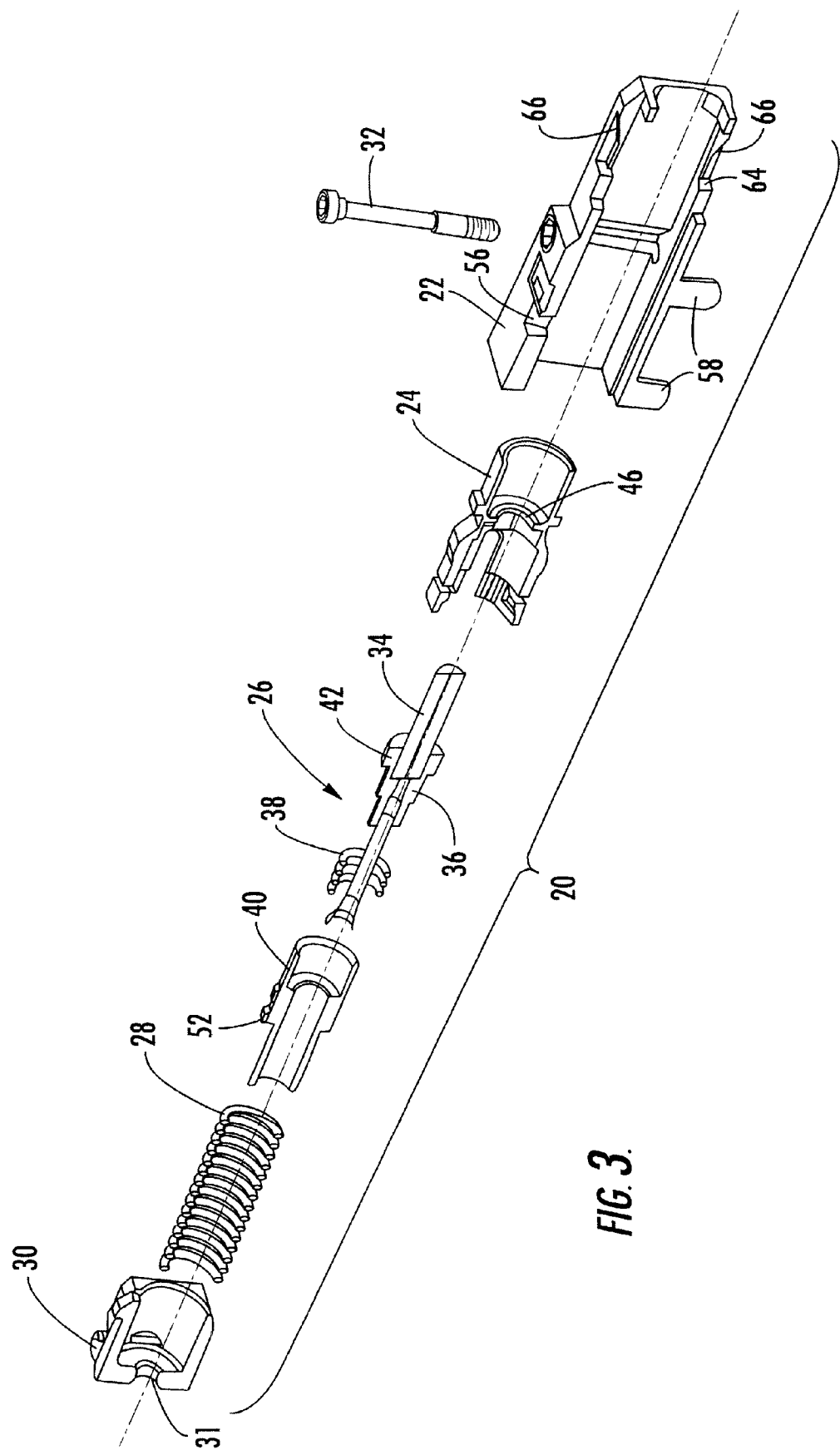
FIG. 3 is an exploded perspective view of the connector sectioned in half as in FIG. 2.
Figure 4:
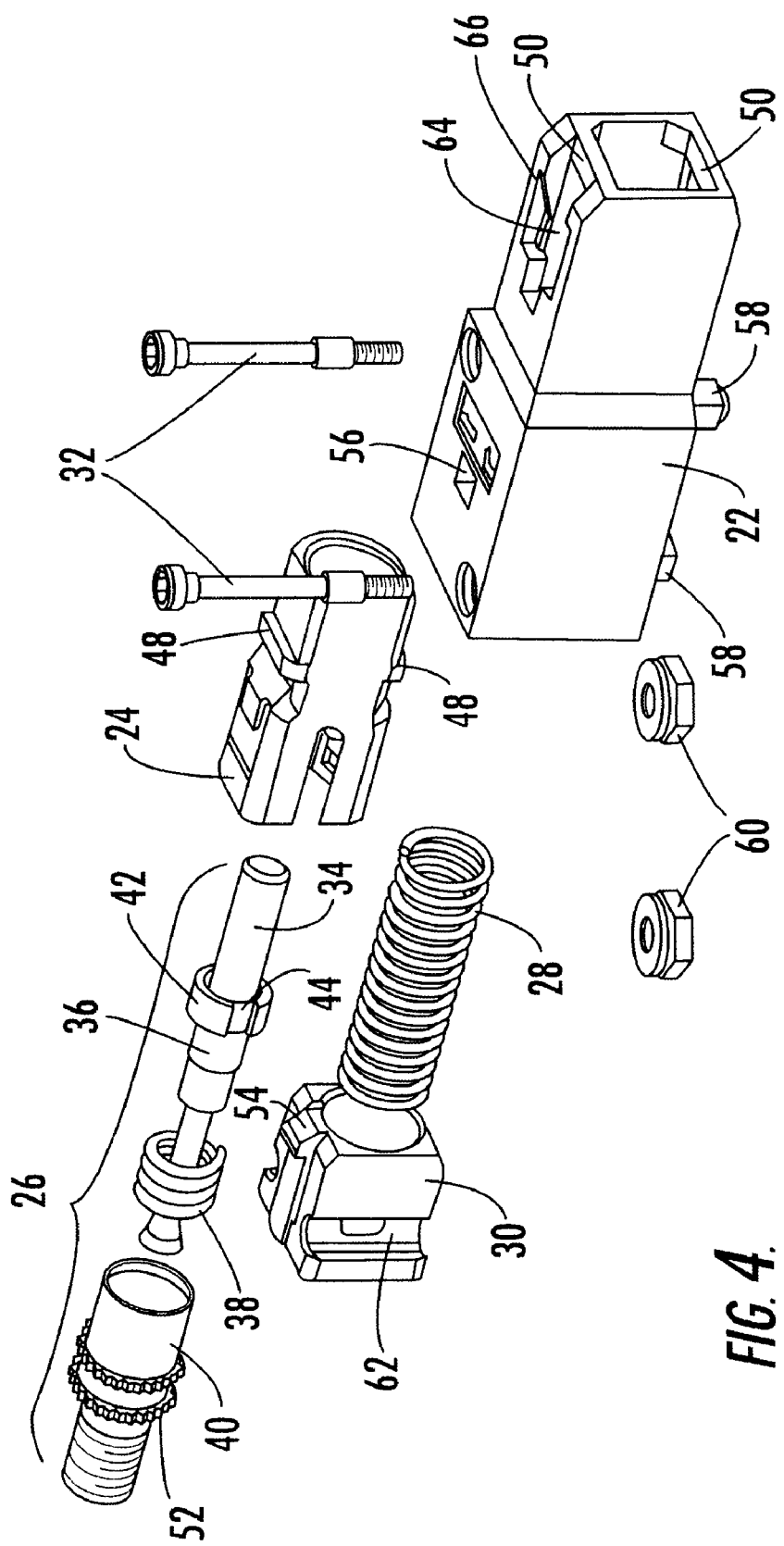
FIG. 4 is an exploded perspective view of the various components of the connector.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 through 4 depict a panel-mounted fiber optic connector 20 in accordance with one preferred embodiment of the invention. The connector 20 generally comprises an outer housing 22, an inner housing 24, a ferrule assembly 26, a main spring 28, a spring retainer 30, and fasteners 32 for securing the connector to a panel. The outer housing 22 is a generally rectangular tubular structure defining an interior passage extending longitudinally therethrough. The outer housing can be formed of any suitable material such as plastic.

The inner housing 24 and ferrule assembly 26 collectively form a connector insert subassembly that can be assembled as a unit and then inserted (left to right in FIG. 3) into the outer housing 22 through a rear end thereof. The inner housing 24 is a generally tubular structure configured to slide into the outer housing from the rear end until surfaces on the inner housing abut a stop defined by the outer housing, as further described below. The ferrule assembly 26 is configured to slide into the inner housing 24 through a rear end thereof. The ferrule assembly 26 comprises a cylindrical ferrule 34, a ferrule holder 36, a ferrule spring 38, and a crimp body 40. The ferrule 34 is preferably made of a ceramic material although any able material may be used (e.g. thermoset or thermoplastic) and has a longitudinal bore therethrough for receiving an end of an optical fiber onto which the connector 20 is to be installed. The ferrule holder 36 is generally tubular, a forward portion of the ferrule holder 36 defining a receptacle into which the ferrule 34 is fixedly mounted such that the ferrule 34 projects longitudinally forward out from the front end of the ferrule holder. The ferrule holder 36 has a generally annular flange 42 with a slot 44 machined therein. The ferrules typically have some error in concentricity, and the concentricity of longitudinal bore relative to the outer surface of the ferrule is determined. After the concentricity is determined, the ferrule 20 is inserted into the ferrule holder 36 with the concentricity oriented in a predetermined relationship to the slot 44. The slot 44 in turn engages a corresponding key (not shown) formed on an inner surface of the inner housing 24 such that the concentricity angle of the ferrule is in a known orientation with respect to the inner housing, and then with respect to the connector since the inner housing 24 is in a predetermined orientation. Thus, connectors made in accordance with the present invention will have their concentricity angles oriented in the same direction, and therefore the insertion loss incurred when the connectors are mated end-to-end can be minimized.

The ferrule spring 38 fits over a rear end of the ferrule holder 36, and the tubular crimp body 40 in turn fits over the rear end of the ferrule holder 36 and the ferrule spring 38 so as to capture the ferrule spring 38 between the flange 42 and a shoulder defined on the inner surface of the crimp body 40. The ferrule spring 38 urges the ferrule holder 36 and ferrule 34 longitudinally forward relative to the crimp body 40.

The ferrule assembly 26, comprising the ferrule 34 and ferrule holder 36, the ferrule spring 38, and the crimp body 40, is inserted into the inner housing 24 until the flange 42 on the ferrule holder abuts a stop 46 formed on the inner surface of the inner housing. The ferrule 34 projects longitudinally forward through the stop and out the front end of the inner housing.

The insert subassembly comprising the ferrule assembly contained in the inner housing is then inserted into the rear end of the outer housing 22 until projections 48 formed on the inner housing 24 abut corresponding stops 50 formed at the forward end of the outer housing. In this position of the inner housing, a front portion of the inner housing projects longitudinally out from the front end of the outer housing as seen in FIG. 1.

The main spring 28 is then inserted into the rear end of the outer housing 22 and over the tubular rear end of the crimp body 40 until the spring abuts an annular flange 52 formed on the crimp body. The rear end of the crimp body 40 serves as a spring guide for the main spring 28. Next, the spring retainer 30 is inserted into the rear end of the outer housing 22. The spring retainer is a generally cup-shaped body whose open forward end receives the rear end of the main spring 28. The rear end of the spring retainer has a bore 31 therethrough for receiving an optical fiber. The spring retainer has a resilient finger 51 that defines a projection or catch 54 that is depressed inwardly upon inserting the spring retainer into the outer housing. The catch 54 springs outwardly into engagement with an aperture or recess 56 in the outer housing so as to prevent the spring retainer from being pushed out the rear end of the outer housing. Preferably, the main spring 28 is somewhat compressed by the spring retainer 30 so that the main spring continuously urges the crimp body 40 forward, which in turn urges the ferrule holder 36 forward via the ferrule spring 38. The substantial length of the outer housing 22 and the main spring 28 and ferrule spring 38 enable the ferrule 34 to "float" to a significant extent within the connector. The finger and recess in the preferred embodiment are generally directed upward. This orientation allows a plurality of connectors to be mounted adjacent one another and still allow the access to the fingers or the potential to remove the inner housing to fix, replace, etc., the inner housing or its components without having to remove the outer housing or even adjacent connectors from the board.

The outer housing 22 includes mounting elements for mounting the connector on a panel such as a circuit board, backplane, panel, or the like. In the illustrated embodiment, the mounting elements comprise a pair of elongate screws 32 that pass through the outer housing from one side thereof and project out the opposite side of the housing, and a pair of projections 58 integrally formed on the side of the housing. The projections 58 engage holes in the panel (not shown), the threaded ends of the screws 32 pass out the bottom of the housing and into other holes in the panel and are secured with nuts 60 on the opposite side of the panel from the connector, thereby securing the connector to the panel. Preferably, the screws 32 are torque-resistant screws, although any appropriate screws could be used. Other types of mounting elements could be used instead of the screws 32 and projections 58. For instance, the projections 58 could be omitted, or the screws 32 could be omitted and the projections could be configured to snap into holes in the panel such as by forming the projections as split protrusions or the like. Other types of fasteners could be used also.

Figure 5:
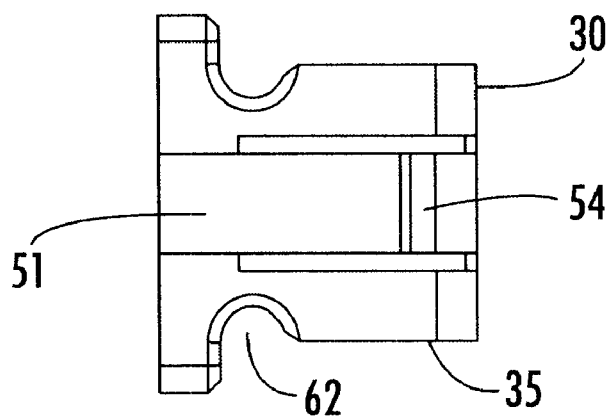
FIG. 5 is a top view of spring retainer in accordance with one embodiment of the present invention.
Figure 6:
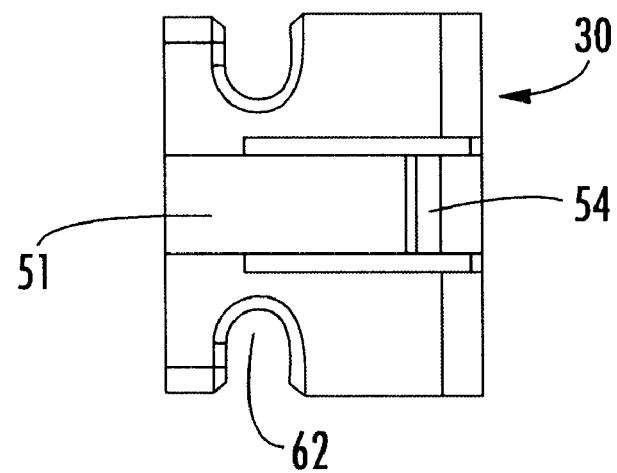
FIG. 6 is a top view of an another embodiment of a spring retainer in accordance with the present invention.

In the illustrated embodiment, removal of the spring retainer 30 is allowed even though the rear elongate screw is mounted to the panel. This is accomplished by providing the spring retainer 30 with a recess 62 that is engaged by the rear screw 32 and a portion 35 having a reduced width at a forward end of the spring retainer 30 as best shown in FIG. 5. Screw 32 also has a reduced diameter 33 where the screw engages recess 62. The spring retainer can be removed by depressing the resilient projection 54 to disengage it from the aperture 56 in the outer housing. Alternatively and as shown in FIG. 6, the spring retainer could be designed without the reduced width portion 35 to prevent the spring retainer from being removed without removing at least the rear screw 32.

Preferably, the inner housing 24 is configured as a standard inner housing so that part commonality is provided between the panel-mounted connectors of the invention and standard non-panel-mounted connectors. While a standard SC-type connector is illustrated, other ferrules and/or connector configurations could be used, e.g., LC, ST®, DC, etc. Additionally, the forward portion of the outer housing 22 is preferably configured as a standard SC outer housing so that the connector 20 is compatible with standard polishing fixtures used for non-panel-mounted SC connectors. More particularly, the forward portion of the outer housing 22 includes openings 64 through opposite side walls thereof through which resilient fixing members of a polishing fixture can extend so as to engage the projections 48 on the inner housing to restrain the inner housing from moving rearward during a polishing operation. The outer housing further includes ramp surfaces 66 proximate the openings 64 through the side walls thereof, the ramp surfaces sloping outwardly away from a central longitudinal axis of the connector in the forward longitudinal direction such that pulling rearwardly on the outer housing 22 causes the ramp surfaces 66 to move the resilient fixing members of the polishing fixture outwardly to disengage the projections 48 on the inner housing so that the connector can be removed from the polishing fixture.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic connector for mounting on a panel, comprising:

an outer housing extending in a forward longitudinal direction from a rear end to a forward end thereof, the outer housing having side walls and defining an interior passage extending longitudinally therethrough;

at least one mounting element connected with the outer housing for mounting the connector onto a panel;

a connector insert subassembly inserted through the rear end of the outer housing into the interior passage thereof, the connector insert subassembly being slidable longitudinally within the outer housing, comprising an inner housing and a ferrule, the inner housing defining an inner passage extending longitudinally therethrough;

a compression spring inserted into the rear end of the outer housing abutting the connector insert subassembly; and a spring retainer inserted into the outer housing behind the compression spring to capture the spring in a compressed condition so as to cause the spring to bias the connector insert subassembly forwardly against a stop defined by the outer housing.

2. The fiber optic connector of claim 1, wherein the spring retainer and the outer housing are structured and arranged such that the spring retainer is inserted into the rear end of the outer housing in the forward longitudinal direction until cooperative retaining elements formed on the spring retainer and the outer housing engage each other to fix the spring retainer in the longitudinal direction.

3. The fiber optic connector of claim 2, wherein the retaining elements comprise resilient projections formed on one of the spring retainer and the outer housing, and recesses formed in the other of the spring retainer and the outer housing for receiving the resilient projections.

4. The fiber optic connector of claim 1, wherein the at least one mounting element comprises an elongate fastener passing transversely through the outer housing and out one side wall thereof for engaging an opening through the panel.

5. The fiber optic connector of claim 4, wherein the spring retainer includes a recess engaged by the elongate fastener such that the fastener prevents removal of the spring retainer.

6. The fiber optic connector of claim 1, wherein the compression spring comprises a coil spring and the connector insert subassembly further comprises a spring guide connected to the inner housing and having a rear portion that receives the coil spring thereover.

7. The fiber optic connector of claim 1, wherein the ferrule holder and ferrule are slidable as a unit in the longitudinal direction within the inner housing, and wherein the connector insert subassembly further comprises a ferrule spring and a member connected with the inner housing for compressing the ferrule spring between the member and the ferrule holder such that the ferrule spring biases the ferrule holder forwardly against a stop defined by the inner housing.

8. The fiber optic connector of claim 7, wherein a forward portion of the ferrule, when the ferrule holder is biased by the ferrule spring forward against the stop of the inner housing, projects longitudinally forward out a forward end of the inner housing, and wherein the forward end of the inner housing, when the connector insert subassembly is biased by the compression spring forward against the stop of the outer housing, projects longitudinally forward out the forward end of the outer housing.

9. The fiber optic connector of claim 1, wherein the outer housing includes openings through opposite side walls thereof through which resilient fixing members of a polishing fixture can extend so as to engage projections on the inner housing to restrain the inner housing during a polishing operation.

10. The fiber optic connector of claim 1, wherein the at least one mounting element includes a pair of protrusions formed integrally with one side wall of the outer housing for engaging openings through the panel.

11. The fiber optic connector of claim 10, wherein the protrusions comprise resilient split protrusions.

12. The fiber optic connector of claim 10, wherein the at least one mounting element further comprises a pair of fasteners passing transversely through the outer housing and out the side wall having the protrusions for engaging further openings in the panel.

13. The fiber optic connector of claim 12, wherein the fasteners comprise torque-resistant screws.

14. The fiber optic connector of claim 12, wherein the spring retainer includes a recess that receives one of the fasteners and also includes a reduced width portion such that the spring retainer may be removed from the outer housing when the fastener is installed through the outer housing.

15. A fiber optic connector for mounting on a panel, comprising:

an outer housing extending in a forward longitudinal direction from a rear end to a forward end thereof, the outer housing having side walls and defining an interior passage extending longitudinally therethrough;

at least one mounting element connected with the outer housing for mounting the connector onto a panel;

a connector insert subassembly inserted through the rear end of the outer housing into the interior passage thereof, the connector insert subassembly being slidable longitudinally within the outer housing, comprising a ferrule, a ferrule holder on which the ferrule is mounted, and a first spring to allow the ferrule and ferrule holder to move relative to the connector;

a compression spring inserted into the rear end of the outer housing abutting the connector insert subassembly; and a spring retainer inserted into the rear of the outer housing behind the compression spring to cause the spring to bias the connector insert subassembly forwardly in the outer housing.

16. The fiber optic connector of claim 15, wherein the spring retainer and the outer housing are structured and arranged such that the spring retainer is inserted into the rear end of the outer housing in the forward longitudinal direction until cooperative retaining elements formed on the spring retainer and the outer housing engage each other to fix the spring retainer in the longitudinal direction.

17. The fiber optic connector of claim 16, wherein the retaining elements comprise resilient projections formed on one of the spring retainer and the outer housing, and recesses formed in the other of the spring retainer and the outer housing for receiving the resilient projections.

18. The fiber optic connector of claim 15, wherein the at least one mounting element comprises an elongate fastener passing transversely through the outer housing and out one side wall thereof for engaging an opening through the panel.

19. The fiber optic connector of claim 18, wherein the compression spring comprises a coil spring and the connector insert subassembly further comprises a spring guide connected to the inner housing and having a rear portion that receives the coil spring thereover.

20. The fiber optic connector of claim 15, wherein the at least one mounting element includes a pair of protrusions formed integrally with one side wall of the outer housing for engaging openings through the panel.

21. The fiber optic connector of claim 16, wherein the protrusions comprise resilient split protrusions for snapping into the openings in the panel.

22. The fiber optic connector of claim 15, wherein the at least one mounting element further comprises a pair of fasteners passing transversely through the outer housing and out the side wall having the protrusions for engaging further openings in the panel.

23. A fiber optic connector for mounting on a panel, comprising:

an outer housing extending in a forward longitudinal direction from a rear end to a forward end thereof, the outer housing having side walls and defining an interior passage extending longitudinally therethrough;

at least one mounting element connected with the outer housing for mounting the connector onto a panel; and a connector insert subassembly inserted through the rear end of the outer housing into the interior passage thereof, the connector insert subassembly being capable of sliding longitudinally within the outer housing and being biased forward by a resilient member, comprising an inner housing, a ferrule assembly, and a spring, the inner housing defining an inner passage extending longitudinally therethrough and the ferrule assembly including at least a ferrule holder mounted within the inner passage of the inner housing and a ferrule mounted in the ferrule holder, and the spring biased against the ferrule assembly to allow the ferrule assembly to move relative to the inner housing.

24. The fiber optic connector of claim 1, wherein the ferrule is a portion of a ferrule assembly including at least a ferrule holder mounted within the inner passage of the inner housing and the ferrule is mounted in the ferrule holder.

\* \* \* \* \*